United States Patent
Todoric et al.

(10) Patent No.: US 10,750,029 B2
(45) Date of Patent: Aug. 18, 2020

(54) SIGNAL SPLITTER/COMBINER WITH AN ELECTRO-MAGNETIC INTERFERENCE FILTER

(71) Applicant: COMTEST NETWORKS INC., Ottawa (CA)

(72) Inventors: Savo Todoric, Nepean (CA); Russell D Adams, Jackson, WY (US)

(73) Assignee: COMTEST NETWORKS INC., Ottawa (CA)

( * ) Notice: Subject to any disclaimer, the term of this patent is extended or adjusted under 35 U.S.C. 154(b) by 0 days.

(21) Appl. No.: 15/910,118

(22) Filed: Mar. 2, 2018

(65) Prior Publication Data
US 2018/0262624 A1    Sep. 13, 2018

(30) Foreign Application Priority Data

Mar. 10, 2017    (CA) ...................................... 2960491

(51) Int. Cl.
*H04M 11/06*    (2006.01)
*H04B 3/21*    (2006.01)
*H04B 3/50*    (2006.01)

(52) U.S. Cl.
CPC ............ *H04M 11/062* (2013.01); *H04B 3/21* (2013.01); *H04B 3/50* (2013.01)

(58) Field of Classification Search
CPC ........... H04M 11/062; H04B 3/21; H04B 3/50
See application file for complete search history.

(56) References Cited

U.S. PATENT DOCUMENTS

| | | | |
|---|---|---|---|
| 7,042,310 B1 * | 5/2006 | Petzold ............... | H01F 1/15316 333/118 |
| 2004/0146068 A1 * | 7/2004 | Chaplik ............... | H04M 11/062 370/485 |
| 2005/0078709 A1 * | 4/2005 | Kunisch .................... | H04J 1/12 370/480 |

* cited by examiner

*Primary Examiner* — Stella L. Woo
(74) *Attorney, Agent, or Firm* — Pearne & Gordon LLP

(57) ABSTRACT

A splitter/combiner configured to split and combine Plain Old Telephone Service (POTS) signals and data service signals. The splitter/combiner comprises a line terminal configured to receive wires of a local loop connection to a Central Office of a communications network; a phone terminal configured to connect to telephone equipment at a customer premise; a data terminal configured to connect to a modem at a customer premise; a POTS line low pass filter connected between the line terminal and the phone terminal, the POTS line low pass filter configured to attenuate frequencies above 25 kHz and including a POTS line side transformer; a surge arrestor connected between the POTS line side transformer and the phone terminal; and a data line transformer configured as a differential mode choke connected between the line terminal and the data terminal.

3 Claims, 2 Drawing Sheets

SIGNAL SPLITTER/COMBINER WITH AN ELECTRO-MAGNETIC INTERFERENCE FILTER

CROSS REFERENCE TO RELATED APPLICATIONS

This application claims priority of Canadian Patent Application No. 2,960,491 filed Mar. 10, 2017, the entire content of which is incorporated herein by reference.

FIELD OF THE INVENTION

The present invention pertains to the field of communications, and in particular to an Signal splitter/combiner with an Electro-Magnetic Interference (EMI) filter.

BACKGROUND

Communications Service providers commonly provide voice and data communications to each customer premise through a respective local loop between a Central Office and a demarcation point at the customer premise. The local loop is typically constructed as a pair of copper wires (commonly referred to as "tip" and "ring", respectively), which may be either twisted together or flat untwisted. Traditionally, copper wire local loops were installed to carry voice communications (i.e. "Plain Old Telephone Service", POTS). However, more recently, Communications Service providers have added data services using Digital Subscriber Line (DSL) services and its successors.

The demarcation point at the customer premise normally includes a splitter to separate the voice and data service signals. As may be seen in FIG. 1, a splitter 100 typically includes a line terminal 102, a phone terminal 104 and a data terminal 106. The line terminal 102 is configured to connect to the copper wire local loop Central Office, and so sends and receives signals associated with both of the voice and data services. The phone terminal 104 is configured to connect to customer owned telephone equipment, and so sends and receives signals associated with POTS services. The data terminal 106 is configured to connect to a customer owned modem and so sends and receives signals associated with data services.

Typically, the voice and data services signals are separated in the splitter 100 by low pass filter 108 which represents low impedance to POTS service signalling, while rejecting the higher frequency data service signals. This operation relies on recognition that POTS signalling typically involves only voice band frequencies (i.e. between about 200 Hz and 4 kHz), whereas data service signalling typically involves frequencies above 25 kHz. Accordingly, the low pass filter 108 can be designed to attenuate frequencies above 25 kHz, while passing the audio-frequency POTS signalling with low distortion. In the example of FIG. 1, the low pass filter 108 is provided as an LC-circuit comprising a pair of transformers 110, 112 and corresponding capacitors 114, 116. The data terminal 106 receives both POTS and data service signalling. However, the low-frequency POTS signalling can easily be rejected by a conventional modem utilizing high pass filter (not shown). By this means, the high frequency data signalling is removed from the POTS signalling by the low pass filter 108, and the low frequency POTS signalling does not significantly interfere with the high frequency data signalling.

A surge arrestor 118 is typically provided on the line side of the splitter 100 in order to dissipate voltage surges in the local loop, resulting from lighting strikes, for example.

In response to customer demand, communications service providers have progressively increased the speed of data services offered through twisted pair copper infrastructure. For example Very-high-bit-rate Digital Subscriber Line (VDSL) offers speeds of up to 52 Mbit/s downstream and 16 Mbit/s upstream, over a single flat untwisted or twisted pair of copper wires using the frequency band from 25 kHz to 12 MHz. Second generation Very-high-bit-rate Digital Subscriber Line (VDSL2) uses frequencies of up to 30 MHz to provide data rates exceeding 100 Mbit/s in both the upstream and downstream directions. At these high frequencies, Electro-Magnetic Interference (EMI) is an important factor limiting performance of the data service. A further limiting factor is the discrete capacitance of the surge arrestor 118, which tends to introduce interference into the data line. Typically, the discrete capacitance of the surge arrestor 118 is minimized by the use of Gas Discharge Tube (GDT) technology. However, GDT surge arrestors have a limited life, and their properties tend to change with each discharge cycle. Low-cost techniques for addressing the above issues would be desirable.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a signal splitter having reduced interference on the data line.

Accordingly, as aspect of the present invention provides a splitter/combiner configured to split and combine Plain Old Telephone Service (POTS) signals and data service signals. The splitter/combiner comprises a line terminal configured to receive wires of a local loop connection to a Central Office of a communications network; a phone terminal configured to connect to telephone equipment at a customer premise; a POTS line low pass filter connected between the line terminal and the phone terminal, the POTS line low pass filter configured to attenuate frequencies above 25 kHz and including a POTS line side transformer; a surge arrestor connected between the POTS line side transformer and the phone terminal; and a data line transformer configured as a differential mode choke connected between the line terminal and the data terminal.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
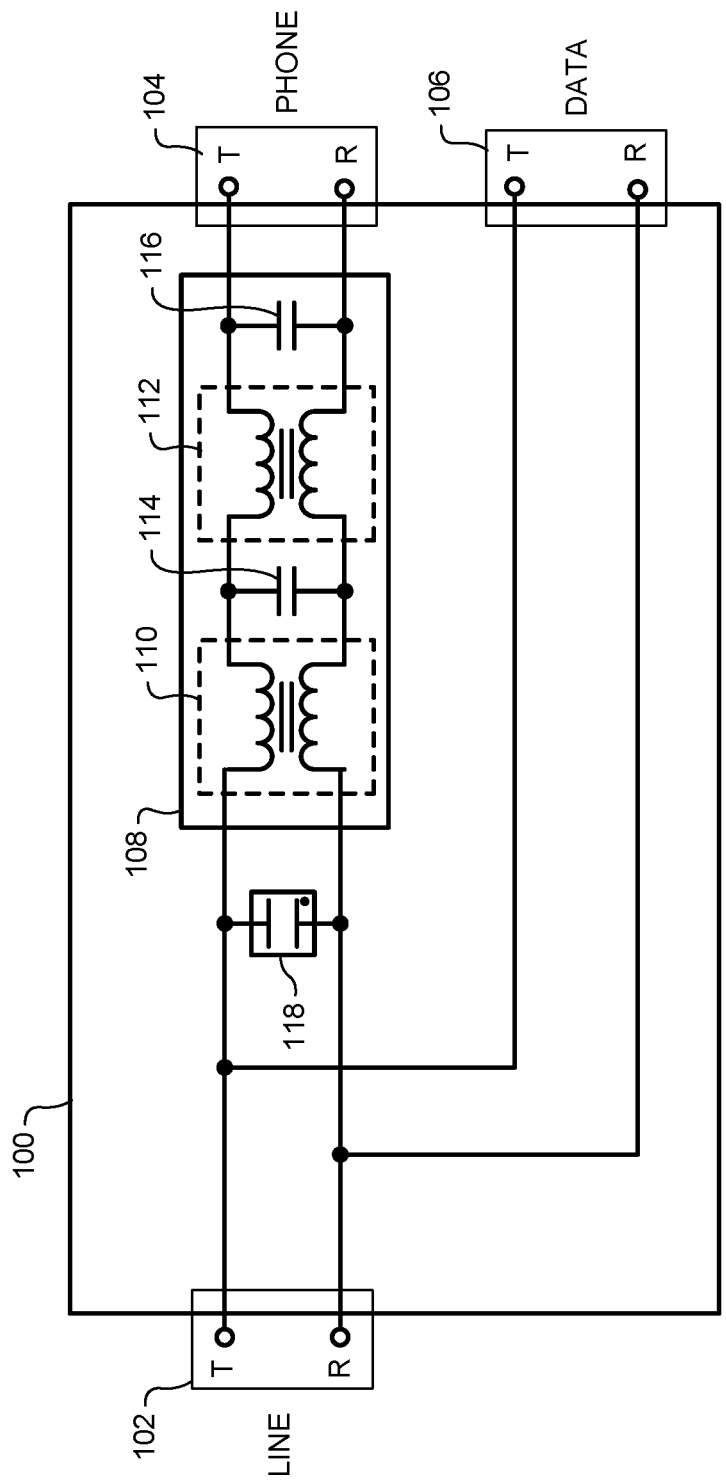
FIG. 1 schematically illustrates elements of a splitter.
Figure 2:
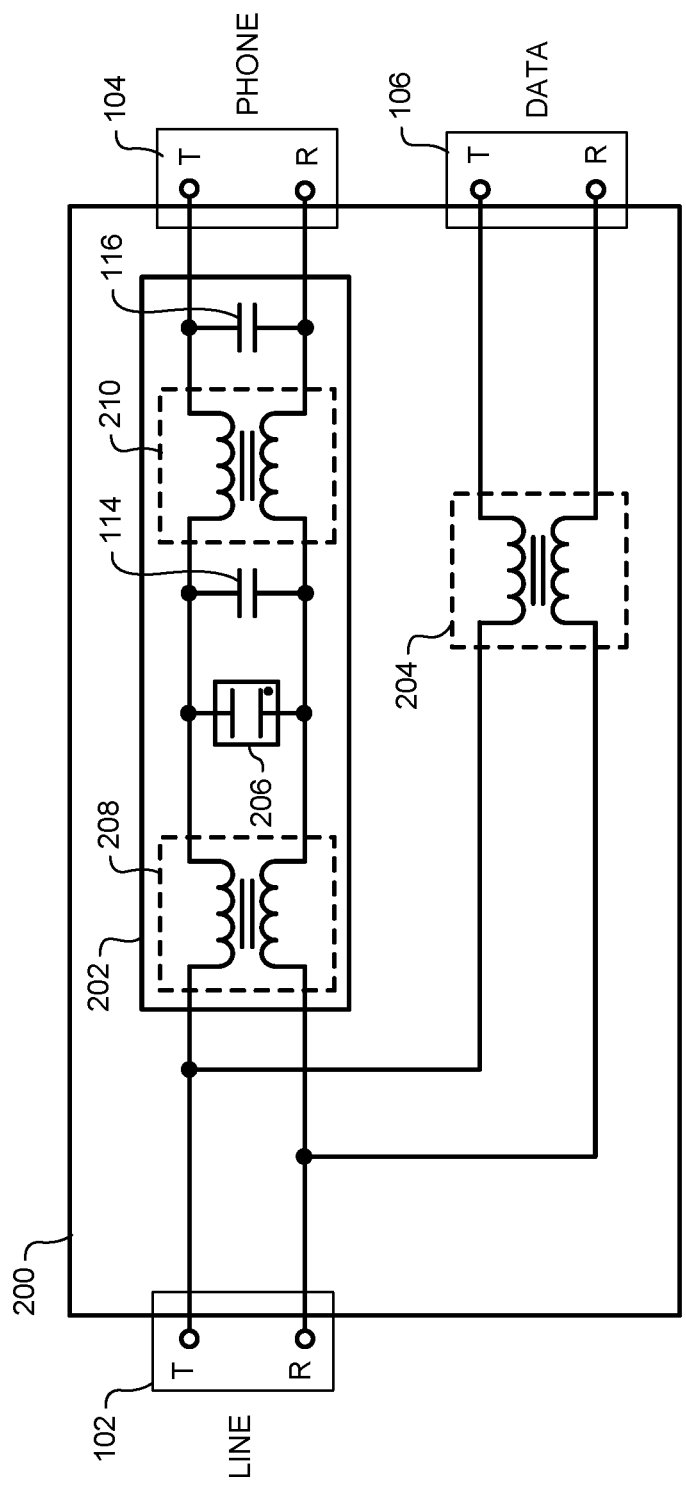
FIG. 2 schematically illustrates elements of a splitter in accordance with a representative embodiment of the present invention.

Referring to FIG. 2, a splitter in accordance with a representative embodiment of the present invention generally comprises a line terminal 102, a phone terminal 104 and a data terminal 106, along with a POTS line low pass filter 202, a data line transformer 204 and a surge arrestor 206. The line terminal 102, phone terminal 104 and data terminal 106 may be configured in a manner closely similar to that described above with reference to FIG. 1, and thus will not be described in greater detail below.

The POTS line low pass filter 202 is designed to pass voice band signal frequencies (i.e. between about 200 Hz and 4 kHz), while attenuating higher frequencies (i.e. frequencies above about 25 kHz). For this purpose, the POTS line low pass filter 202 is provided as an LC circuit that includes a line side transformer 208, a terminal side transformer 210 and a pair of capacitors 114 and 116. The line side transformer 208, terminal side transformer 210 and capacitors 114 and 116 may operate in a manner similar to the corresponding elements in the example of FIG. 1 to define a filter characteristic that attenuates data service signalling while passing POTS services signalling with low distortion. However, in the embodiment of FIG. 2, the surge arrestor 206 is located within the POTS line low pass filter 202, between the line side transformer 208 and the terminal side transformer 210. The location of the surge arrestor 206 implies that the POTS line transformer 208 must be further configured to tolerate transient currents (surges) in the local loop, resulting from lighting strikes, for example. It will be appreciated that each of the line side transformer 208 and terminal side transformer 210 comprises a pair of inductors (one inductor on each of the tip and ring paths) magnetically coupled together. If desired, either (or both) of the transformers may be replaced by a corresponding pair of magnetically uncoupled inductors.

Because surges in the local loop are predominantly differential mode, the energy of such surges can traverse the line side transformer 208 and so may be dissipated in the surge arrestor 206. For this reason, the line side transformer 208 will tend to be larger and more expensive than the transformer 109 of FIG. 1. However, the arrangement of FIG. 2 has an advantage that the line side transformer 208 can effectively isolate the discrete capacitance of the surge arrestor 206 from the data terminal 106, and therefore reduces interference in the data service signalling due to the surge arrestor 206. Because the location of the surge arrester 206 eliminates the impact of its capacitance on the data terminal 106, it is possible to use surge arrester technology with a higher-capacitance than GDT. For example, the surge arrester 206 may be provided as a thyristor based solid state protector having a relatively high discrete capacitance but with a faster response (as compared to GDT, for example) and little if any degradation in performance over time.

The data line transformer 204 is preferably configured as a common mode choke having a low impedance to high frequency differential mode signals, such as data service signalling. With his arrangement, the data line transformer 206 may attenuate common mode noise such as Electro-Magnetic Interference (EMI), while passing data service signalling with minimal distortion.

In combination, the POTS line low pass filter 202, data line transformer 204, and the location of the surge arrestor 206 "behind" the POTS line transformer 208 effectively splits the POTS and data service signalling, while minimizing effects of EMI on the data services. This, in turn, supports high-speed data rates for the data service signalling.

It will be appreciated that the splitter 200 illustrated in FIG. 2 is a reciprocal device, in that downlink POTS and data signals received through the line terminal 102 from a central office will be separated and output through the phone and data terminals 104 and 106, respectively; while at the same time, uplink POTS and data signals received through the phone and data terminals 104 and 106, respectively, will be combined and transmitted through the line terminal 102 to the central office. Thus it will be appreciated that the splitter 200 may equally be referred to as a "combiner" or a "splitter/combiner".

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A splitter/combiner configured to split and combine Plain Old Telephone Service (POTS) signals and data service signals, the splitter/combiner comprising:
   a line terminal configured to receive wires of a local loop connection to a Central Office of a communications network;
   a phone terminal configured to connect to telephone equipment at a customer premise;
   a data terminal configured to connect to a modem at a customer premise;
   a POTS line low pass filter connected between the line terminal and the phone terminal, the POTS line low pass filter configured to attenuate frequencies above 25 kHz and including a line side transformer and a terminal side transformer;
   a surge arrestor connected to tip and ring lines between the line side transformer and the terminal side transformer, the surge arrester configured to dissipate transient currents in the local loop connection resulting from lighting strikes; and
   a data line transformer connected between the line terminal and the data terminal, the data line transformer configured as a common mode choke having a low impedance to high frequency differential mode signals so as to attenuate Electro-Magnetic Interference (EMI).

2. The splitter/combiner as claimed in claim 1, wherein the surge arrestor is a solid-state surge arrester.

3. The splitter/combiner as claimed in claim 1, wherein at least one of the line side transformer and the terminal side transformer comprises a respective pair of magnetically uncoupled inductors.

* * * * *